United States Patent [19]

Kiyoura et al.

[11] 3,890,381

[45] June 17, 1975

[54] METHOD FOR THE PREPARATION OF DIALKALIOXYDIACETATE

[75] Inventors: Tadamitsu Kiyoura, Kamakura; Toru Takahashi, Fujisawa; Yasuo Kogure, Yokohama, all of Japan

[73] Assignee: Mitsui Toatsu Chemicals Incorporated, Tokyo, Japan

[22] Filed: Dec. 11, 1973

[21] Appl. No.: 423,778

[30] Foreign Application Priority Data
Mar. 13, 1973 Japan.............................. 48-28595
Apr. 9, 1973 Japan.............................. 48-39521

[52] U.S. Cl.......................... 260/531 C; 260/535 P
[51] Int. Cl............................................ C07c 51/26

[58] Field of Search..................... 260/535 P, 531 C

[56] References Cited
UNITED STATES PATENTS
3,717,676  2/1973  Bechara.............................. 260/535

*Primary Examiner*—Lorraine A. Weinberger
*Assistant Examiner*—Paul J. Killos

[57] ABSTRACT

A method for preparing a dialkalioxydiacetate by contacting diethylene glycol with a gas containing molecular oxygen in the presence of water, an alkaline substance and a catalyst. The catalyst is composed of at least one of palladium, platinum, rhodium, ruthenium, rhenium, osmium, iridium and the oxides thereof.

9 Claims, No Drawings

METHOD FOR THE PREPARATION OF DIALKALIOXYDIACETATE

FIELD OF THE INVENTION

This invention relates to a method for directly preparing a dialkalioxydiacetate of the general formula

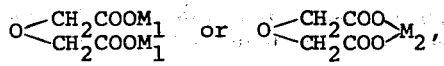

wherein $M_1$ and $M_2$ represent an alkali metal and an alkaline earth metal respectively, e.g., disodiumoxydiacetate, by oxidizing diethylene glycol with a molecular oxygen-containing gas.

BACKGROUND OF THE INVENTION

Many methods for the preparation of, for example, disodiumoxydiacetate have been proposed, including: (1) the reaction of formaldehyde, carbon monoxide and water at high temperatures under pressurized conditions in the presence of an acid catalyst to produce glycolic acid, which is in turn methoxyethylated with a mixture of methanol and an aqueous solution of formaldehyde and then reacted with carbon monoxide at high temperatures under pressure to produce diglycolic acid, the resultant diglycolic acid being then neutralized with a caustic alkali to obtain disodiumoxydiacetate; (2) the oxidation of diethylene glycol with nitric acid to produce diglycolic acid, which is then neutralized with a caustic alkali as mentioned above; (3) the hydrolysis of monochloroacetic acid in the presence of an alkaline substance; and (4) the dehydrogenation of diethylene glycol in the liquid phase in the presence of water, an alkaline substance and cadmium oxide.

However, the aforementioned methods have definite inherent disadvantages. More particularly, method (1) requires a large number of steps, is a complicated process and also necessitates undesirably high reaction temperatures and pressures and expensive reaction apparatus; method (2) contributes to environmental pollution by exhausting $NO_x$ gases; method (3) is feasible merely on an experimental scale; and method (4), described in U.S. Pat. No. 3717676, although proposing to dehydrogenate diethylene glycol at 190°–232° C under 75 – 200 psig. to produce disodiumoxydiacetate produces some undesirable by-products including sodium glycolate, sodium acetate, and sodium oxalate. Although the total selectivity to disodiumoxydiacetate and sodium glycolate reaches as high as 91 % at a maximum, relatively complicated steps are disadvantageously required to isolate a high yield of the disodiumoxydiacetate from the solid mixture. The formation of by-products is considered to be caused by the decomposition of diethylene glycol. In order to suppress the decomposition reactions, it would be necessary to conduct the reaction under milder conditions than those described in the aforementioned United States Patent, but in this case the yield of disodiumoxydiacetate is extremely low and uneconomical.

SUMMARY OF THE INVENTION

It is therefore, an object of the present invention to provide a method for directly preparing a dialkalioxydiacetate by the oxidation of diethylene glycol with a gas containing molecular oxygen, in the presence of an alkaline substance, water and a suitable catalyst.

It is a further object of the present invention to provide a method for preparing a dialkalioxydiacetate without producing large amounts of by-products and, if any are produced, in a manner which allows easy isolation and purification of the dialkalioxydiacetate from such by-products.

It is another object of the present invention to provide a catalyst which is effective for conducting the abovementioned reaction.

It is still another object of the present invention to provide a catalyst which is useful for preparing a dialkalioxydiacetate under relatively mild reaction conditions.

Briefly stated there is provided a method for directly preparing a dialkalioxydiacetate by oxidizing diethylene glycol with a gas containing molecular oxygen in the presence of water, an alkaline substance and a catalyst selected from the group consisting of palladium, platinum, rhodium, ruthenium, rhenium, osmium and iridium, and oxides and mixtures thereof.

The oxidizing reaction proceeds to a sufficient degree under relatively mild temperature conditions such as 20° – 150° C, with the result that substantially no by-products such as formic acid, glycolic acid, oxalic acid, acetic acid and the like are produced. Accordingly, the dialkalioxydiacetate can easily be isolated from the reaction solution in a highly pure form.

DETAILED DESCRIPTION OF THE INVENTION

It has been found that a dialkalioxydiacetate can be directly produced by oxidizing diethylene glycol with a gas containing molecular oxygen in the presence of water, an alkaline substance and a selected catalyst under relatively mild temperature conditions. Due to the nature of the catalyst used, the conversion of diethylene glycol can be effected at a rate greater than 90 % while assuring a selectivity of diethylene glycol to dialkalioxydiacetate as high as 95 %.

Typical catalysts useful in the present invention may be, for example, a metal such as palladium, platinum, rhodium, ruthenium, rhenium, osmium and iridium, or an oxide thereof. Furthermore, the catalytic material may be a combination of the catalysts listed above. Among them, palladium and platinum are particularly useful in attaining high conversion and high selectivity. If palladium or platinum is employed as a catalyst, at least one of metals or metal oxides other than rhodium, ruthenium, rhenium, osmium, and iridium may be used in combination therewith. Examples of other useful metals include copper, silver and gold of group IB of the Periodic Table, beryllium and magnesium of group IIA, zinc and cadmium of group IIB, gallium and thallium of group IIIB, titanium and zirconium of group IVA, germanium, tin and lead of group IVB, vanadium of group VA, antimony and bismuth of group VB, chromium, molybdenum and tungsten of group VIA, selenium of group VIB, manganese of VIIA, iron, cobalt and nickel of group VIII, and thorium and uranium. Furthermore, the oxides of the abovementioned metals, may also be employed.

Although the catalyst may be employed without a carrier, it is usually preferred to support it on a carrier such as activated carbon, alumina gel, a zeolite, or an inorganic or organic ion-exchange resin. The catalytic component or components when selected from palladium, platinum, rhodium, ruthenium, rhenium, osmium, iridium, or the oxides thereof, is preferably supported on a carrier in an amount of 0.1 to 20 % by weight, preferably 0.5 – 3 % by weight.

The catalyst suitable for the purpose of the present invention can be prepared by a known method, for example, by the method described in "Catalysis," written by Berkman, Morrell and Egloff, published by Reinhold Publishing Corporation, New York (1940). However, for the reduction of the catalytic metal component, a method other than that described in the above-mentioned reference may be employed, such as by using an alcoholate of an alkali or alkaline earth metal, or sodium naphthalide. The metal to be used as a catalyst may be, if so desired in the form of a cluster.

The catalyst of the present invention may be used in a batch reaction or in a continuous system using a fixed bed or a fluidized bed. In a batch system, for example, the catalyst charged is suitably in amounts of 1 – 20 g per 500 ml of the aqueous solvent solution in which diethylene glycol and the alkaline substance are dissolved. It will be appreciated however that the amount of catalyst may vary widely when a continuous system using a fixed-bed is used.

The presence of water is required in the reaction system of the present invention, and accordingly an aqueous solvent solution is preferably utilized. Typical solvents include, for example, a mixture of water and an aprotic polar solvent or dioxane which is miscible with water. Water is generally required in an amount of 5 – 30 parts by weight per part by weight of diethylene glycol.

If the ratio of water to diethylene glycol is smaller than 5 parts to 1 by weight, the by-products of side reactions increase in amount and the rate of the reaction decreases. On the other hand, although ratios greater than 30 : 1 aid in preventing the occurrence of side reactions, the use of a large excess of water is undesirable since a great amount of water has to be ultimately removed from the reaction solution. Thus the upper limit of water is preferred to be no more than 30 parts by weight per part of diethylene glycol.

The concentration of diethylene glycol in the reaction solution is generally within the range of 1 – 15 % by weight, preferably 3 – 10 % by weight, based on the weight of the reactants.

The reaction is carried out at a pH value of 7 – 14 by adding an alkaline substance to the reaction solution. If the reaction is conducted under acidic conditions, the decomposition of diethylene glycol is accelerated and formic acid, oxalic acid, glycolic acid, acetic acid and the like are by-produced. The alkaline substance should be added in an amount sufficient to neutralize the diglycolic acid which is produced during the reaction. Furthermore, the alkaline substance may be added either all at one time at the initial stage of the reaction, or alternatively it may be incorporated little by little as the reaction proceeds.

Typical alkaline substances useful in the present invention are, for example, hydroxides, oxides or carbonates of an alkali metal or of an alkaline earth metal, or ammonium hydroxide or ammonium carbonate. Particularly useful are the oxides, hydroxides and carbonates of sodium, potassium, calcium and barium.

As for the gas containing molecular oxygen, oxygen or air are usually employed. The rate of feeding of oxygen gas or oxygen-containing gas is preferably in the range of 0.1 – 4 l/min per liter of reaction solution. The gas is generally fed into the reaction solution preferably through a sintered metal or glass filter having minute pores.

With a gas feed less than 0.1 l/min, the reaction rate becomes disadvantageously slow. On the other hand, when the feed is greater than 4 l/min, the reaction rate would not proportionally increase with an increase of the gas feed. A gas feed over this upper limit tends to be unfavorable since the reaction temperature is lowered by an excessive feed rate and prohibitively greater power is required for the feeding.

Reaction temperatures at which diethylene glycol is oxidized in an oxygen gas-containing atmosphere in the presence of the above-mentioned catalyst, water and the alkaline substance are generally within the range of 20° – 200° C, preferably 20° – 150° C, and the reaction pressure ranges from 1 to 35 atmo., preferably from 1 to 4.8 atmo.

The reaction proceeds very slowly at temperatures lower than 20° C. On the other hand, at temperatures over 200° C, the rate of reaction does not increase proportionally with the rise in temperature, but the production of undesirable by-products is greatly induced. Moreover, when the reaction temperature is raised above about 100° C, the reaction system must be maintained under pressurized conditions in the range defined hereinbefore. When the reaction temperature is lower than 100° C, the rate of reaction may be increased by applying a reaction pressure greater than 1 atm. to increase the partial pressure of the oxygen gas. The time required for the reaction varies with the reaction conditions used, and is generally within the range of 3 – 20 hours for a batch system. How far the reaction has proceeded can be readily ascertained by determining the amount of the alkaline substance present in solution. The time required for completion of the reaction can therefore also be known from such determination.

According to the present invention, the solution obtained after completion of the reaction is filtered to isolate the catalyst from the solution. The filtrate is heated to evaporation and highly pure dialkalioxydiacetate crystals are precipitated out of solution. An elementary analysis reveals that the crystals obtained are pure dialkalioxydiacetate.

Both dialkalioxydiacetate and its precursor diglycolic acid obtained by the method of the present invention, can be suitably used as a starting material for detergents and polyesters. Particularly, disodiumoxydiacetate shows superior and highly desirable properties in algae stimulation, biodegradability and toxicity.

The present invention will be particularly illustrated in the following Examples.

EXAMPLE 1

11g of diethylene glycol (hereinafter referred to simply as DEG), 10.6g of sodium carbonate, 5g of catalyst composed of 2 wt % palladium supported on activated carbon powder (2 wt % of Pd/98 wt % of activated carbon) and 200g of water were introduced into a 500 ml four-neck flask equipped with an agitator, a gas-feeding device, a thermometer and a reflux condenser. Then, 0.8 – 1.0 l/min of air was flowed into the solution for reaction at 72° C for 10 hours under atmospheric pressure. During the course of the reaction, 0.4g of DEG which were entrained in the air stream were collected at the outlet of the reflux condenser. The pH of the solution was 11.8 at the beginning of the reaction, and was 7.8 at the end of the reaction. After completion of the reaction, the catalyst was separated from the solution by filtration, and the resultant filtrate was subjected to evaporation to produce 17.2 g of a white powdery crystalline material identified as disodiumoxydiacetate (hereinafter referred to as SODA) by elementary and IR absorption spectrum analyses. The conversion of DEG was 95 % and the selectivity to SODA was 96 %. A portion of the SODA was dissolved in water and the sodium component was ion-exchanged by means of an ion-exchange resin to obtain a free acid, the melting point of which was found to be the same as that of diglycolic acid.

EXAMPLE 2

Example 1 was repeated except that 8 grams of sodium hydroxide and 6 grams of catalyst composed of 0.8 wt % of Pd and 0.2 wt % of Pt supported on activated carbon powder, were used. Consequently, 17.0 g of a powdery white crystal were obtained. Elementary and IR absorption spectrum analyses revealed that the crystals were SODA. During the reaction, 0.4 g of DEG entrained in the air flow in the form of a mist were collected at the outlet of the reflux condenser. The conversion of DEG was 96 % and the selectivity to SODA was 95 %.

EXAMPLES 3 – 11

Example 1 was repeated except that the catalyst, the flowed gas and the reaction temp. and time conditions were as shown in Table I below. Test results are also shown in the Table.

Then an aqueous solution containing 5.5 % of DEG and 5.2 % of sodium carbonate was introduced continuously into said 1 l flask at a feed rate of 25 cc/hr, and concurrently the same amount of the reaction mixture was continuously withdrawn from the flask through a catalyst sedimentation apparatus.

The withdrawn solution was evaporated and 2.1 g/hr of powdery white SODA were collected.

The reaction was continued successfully for 28 days without appreciable deactivation of the catalyst.

EXAMPLE 13

11 g of DEG, 6.2 g of sodium oxide ($Na_2O$), 5.0 g of a catalyst composed of 1.8 wt % of palladium, 0.2 wt % of platinum, and 1.5 wt % of copper supported on activated carbon powder, and 200 g of water were introduced into a 500 ml four-neck flask equipped as in example 1, 0.8 – 1.0 l/min of air was flowed into the solution for reaction at 100° C under a pressure of 5 atmospheres for 4 hours. The pH of the solution was 13.5 at the beginning of the reaction and it lowered to 7.5 at the end of the reaction.

After completion of the reaction, the catalyst was removed from the solution. The resultant filtrate was subjected to evaporation at 80° C under a reduced pressure of 50 mmHg to yield 16.9 g of a powdery white crystal. Elementary analysis and infrared absorption spectroscopy showed that the crystals were SODA. The DEG conversion was found to be 96 % and the selectivity was 94 %.

Table I

| Example No. | Catalyst | Gas (0.8–1.0) liter/min. | Reaction Temperature (°C) | Reaction Time (Hr) | SODA obtained (g) | Conversion (%) | Selectivity (%) |
| --- | --- | --- | --- | --- | --- | --- | --- |
| 3 | Pt/C | Air | 26–34 | 26 | 16.9 | 95 | 95 |
| 4 | Pd/C | Oxygen | 55–100 | 5 | 17.0 | 95 | 96 |
| 5 | Rh/C | Oxygen | 70–75 | 5 | 16.8 | 95 | 94 |
| 6 | Re/C | Oxygen | 70–75 | 6 | 15.9 | 90 | 94 |
| 7 | Ir/C | Air | 71–75 | 10 | 16.5 | 94 | 94 |
| 8 | Os/C | Oxygen | 55–60 | 4 | 17.0 | 95 | 96 |
| 9 | Pd-Rh/C | Air | 75–80 | 12 | 17.0 | 96 | 95 |
| 10 | Pd-Re/C | Air | 60–65 | 10 | 16.9 | 95 | 95 |
| 11 | Pd-Ru/C | Air | 65–70 | 10 | 17.1 | 95 | 96 |

Notes: In Examples 3–8, 5.5 g of catalyst with 3 wt % of metal supported on activated carbon powder were used. In Examples 9–11, 5.0 g of catalyst with 1 wt % of Pd and 1 wt % of the respective metals supported on activated carbon powder were used.

EXAMPLE 12

23 g of DEG, 21 g of sodium carbonate, 11g of a catalyst composed of 1 wt % of palladium supported on activated carbon powder, and 400 g of water were introduced into a 1 l four-neck flask equipped with an agitator, a gas-feeding device, a thermometer and a reflux condenser. Then, 1.7 – 2.0 l/min of air was blown into the solution for reaction at 70° C for 10 hours. The pH value of the reaction solution was 7.5 – 7.8.

EXAMPLES 14 – 29

Example 1 was repeated in order to test various catalysts, under different reactants and reaction conditions, as shown in Table II below. Product results were also indicated in the Table. It should be noted that each of the catalysts used consisted of 5.0 g composed of 1.8 wt % of palladium, 0.5 wt % of a second optional component and 0.5 wt % of a third optional component supported on activated carbon powder.

Table II

| Exp. No. | Alkaline Substance (g) | Water (g) | Catalyst | Blown gas | Reaction Temp. (°C) | Pressure (atmo) | Reaction Time (hr) | Substance obtained (g) | DEG Conversion (%) | Selectivity (%) |
| --- | --- | --- | --- | --- | --- | --- | --- | --- | --- | --- |
| 14 | $Na_2CO_3$, 10.5 | 140 | Pd-$V_2O_5$-$ZrO_2$ | Air | 100 | 1 | 7 | 17.0 | 96 | 95 |
| 15 | $Na_2O$, 6.2 | 200 | Pd-$MoO_3$-$Fe_2O_3$ | $O_2$ | 70 | 1 | 10 | 16.9 | 96 | 95 |
| 16 | NaOH, 8.0 | 250 | Pd-ZnO-BeO- | $O_2$ | 60 | 1 | 10 | 16.7 | 94 | 95 |

Table II – Continued

| Exp. No. | Alkaline Substance (g) | | Water (g) | Catalyst | Blown gas | Reaction Temp. (°C) | Pressure (atmo) | Reaction Time (hr) | Substance obtained (g) | DEG Conversion (%) | Selectivity (%) |
|---|---|---|---|---|---|---|---|---|---|---|---|
| 17 | KOH, | 11.2 | 200 | Pd-MnO$_2$-TiO$_2$ | Air | 150 | 14 | 5 | 19.5 | 93 | 88 |
| 18 | K$_2$CO$_3$, | 13.8 | 120 | Pd-Cr$_2$O$_3$-Sb$_2$O$_3$ | Air | 200 | 14 | 4 | 20.1 | 95 | 80 |
| 19 | Ba(OH)$_2$, | 17.1 | 250 | Pd-Fe$_2$O$_3$-Cr$_2$O$_3$ | Air | 70 | 1 | 10 | 24.4 | 94 | 94 |
| 20 | Ca(OH)$_2$, | 7.4 | 300 | Pd-Co$_3$O$_4$-CdO | Air | 70 | 1 | 10 | 15.5 | 94 | 93 |
| 21 | LiOH, | 4.8 | 200 | Pd-NiO-Bi$_2$O$_3$ | Air | 70 | 1 | 10 | 12.8 | 95 | 92 |
| 22 | Na$_2$CO$_3$, | 10.5 | 200 | Pd-In$_2$O$_3$-Ir | O$_2$ | 100 | 1 | 8 | 16.9 | 96 | 94 |
| 23 | Rb$_2$CO$_3$, | 23.0 | 200 | Pd-SnO$_2$-GeO$_2$ | O$_2$ | 70 | 1 | 10 | 27.5 | 95 | 94 |
| 24 | Cs$_2$CO$_3$, | 32.5 | 200 | Pd-Au-TeO$_2$ | O$_2$ | 70 | 1 | 10 | 35.5 | 94 | 93 |
| 25 | KOH, | 11.2 | 200 | Pd-Pt-ThO$_3$ | Air | 150 | 14 | 6 | 18.6 | 93 | 84 |
| 26 | NaOH, | 5.0 | 200 | Pd-UO$_3$-Sb$_2$O$_3$ | Air | 150 | 14 | 7 | 15.5 | 92 | 85 |
| 27 | Na$_2$CO$_3$, | 10.5 | 200 | Pd-SeO$_2$-B$_2$O$_3$ | Air | 70 | 1 | 10 | 16.8 | 95 | 92 |
| 28 | Ba(OH)$_2$, | 17.1 | 300 | Pd-PbO$_2$-Au | Air | 100 | 1 | 8 | 24.5 | 94 | 92 |
| 29 | Ca(OH)$_2$, | 7.4 | 300 | Pd-TiO$_2$-PbO$_2$ | Air | 100 | 1 | 8 | 15.7 | 94 | 91 |
| 30 | Li$_2$CO$_3$, | 7.4 | 150 | Pd-NiO-Cr$_2$O$_3$ | Air | 100 | 1 | 8 | 12.6 | 96 | 94 |
| 31 | (NH$_4$)$_2$CO$_3$, | 11.4 | 250 | Pd-Pt-Ag | O$_2$ | 30 | 5 | 10 | 15.4 | 94 | 95 |
| 32 | (NH$_4$)$_2$CO$_3$, | 11.4 | 250 | Pd-Pt-Au | O$_2$ | 30 | 5 | 10 | 15.3 | 95 | 93 |

What is claimed is:

1. A method for the preparation of a dialkalioxydiacetate consisting essentially of contacting at 20° – 200° C and 1 – 35 atmo. pressure and at a pH of 7 – 14 diethylene glycol with a gas selected from oxygen and air in the presence of water in an amount of at least 5 parts by weight per part of diethylene glycol; an alkaline substance selected from the group consisting of hydroxides, oxides and carbonates of an alkali metal and an alkaline earth metal and ammonium hydroxide and carbonate; and at least a catalyst selected from the group consisting of palladium, platinum, rhodium, ruthenium, rhenium, osmium and iridium and oxides thereof.

2. A method according to claim 1, wherein said catalyst is a mixture of a first metal selected from the group of platinum and palladium with a second component metal selected from the group consisting of copper, silver, gold, beryllium, magnesium, zinc, cadmium, gallium, thallium, titanium, zirconium, tin, lead, vanadium, antimony, bismuth, chromium, molybdenum, tungsten, selenium, manganese, iron, cobalt, nickel, thorium, uranium and oxides of said second component metal.

3. A method according to claim 1, wherein said gas is fed at a rate of 0.1 – 4 l per liter of reaction solution.

4. A method according to claim 1, wherein said gas is air.

5. A method according to claim 1, wherein water is in an amount of 5– 30 parts by weight per part of diethylene glycol.

6. A method according to claim 1, wherein said alkaline substance is selected from the group consisting of sodium, potassium, calcium and barium.

7. A method according to claim 1, wherein said reaction is carried out at a temperature of 20° to 150° C under a pressure of 1 to 4.8 atmospheres.

8. A method according to claim 1, wherein said catalyst is palladium supported on an activated carbon.

9. A method for the preparation of disodiumoxydiacetate comprising contacting diethylene glycol with a gas selected from air and oxygen, said gas being fed at a rate of 0.1 – 4 l/min per liter of reaction solution, in the presence of 5 – 30 parts by weight of water per part of diethylene glycol, sodium hydroxide, and palladium catalyst supported on activated carbon, at a temperature of 20° to 150° C under a pressure of 1 to 4.8 atmospheres and at a pH of 7 to 14.

* * * * *